United States Patent
Lehner et al.

(10) Patent No.: US 10,658,896 B2
(45) Date of Patent: May 19, 2020

(54) COIL FOR A COMPRESSOR WHICH CAN BE ELECTRICALLY DRIVEN, AND CORRESPONDING PRODUCTION METHOD

(71) Applicant: BorgWarner Inc., Auburn Hills, MI (US)

(72) Inventors: Hans Lehner, Riemerling (DE); Dietmar Metz, Meckenheim (DE)

(73) Assignee: BorgWarner Inc., Auburn Hills, MI (US)

( * ) Notice: Subject to any disclaimer, the term of this patent is extended or adjusted under 35 U.S.C. 154(b) by 758 days.

(21) Appl. No.: 14/906,917

(22) PCT Filed: Jul. 29, 2014

(86) PCT No.: PCT/US2014/048532
§ 371 (c)(1),
(2) Date: Jan. 22, 2016

(87) PCT Pub. No.: WO2015/017362
PCT Pub. Date: Feb. 5, 2015

(65) Prior Publication Data
US 2016/0164362 A1    Jun. 9, 2016

(30) Foreign Application Priority Data
Aug. 2, 2013 (DE) .......................... 10 2013 012 934

(51) Int. Cl.
*H02K 3/28* (2006.01)
*H02K 15/04* (2006.01)
(Continued)

(52) U.S. Cl.
CPC ............... *H02K 3/28* (2013.01); *F02B 33/40* (2013.01); *F02B 39/10* (2013.01); *F04B 35/04* (2013.01);
(Continued)

(58) Field of Classification Search
CPC .......... F02B 33/40; F02B 39/10; F04B 35/04; F04B 39/14; F04D 25/0606;
(Continued)

(56) References Cited

U.S. PATENT DOCUMENTS 3,348,183 A    10/1967    Hodges et al.
4,756,075 A *   7/1988    Dolgas .................... H02K 3/00
                                                              29/596
(Continued)

FOREIGN PATENT DOCUMENTS

DE    10246423 A1 *  4/2004  ........... H02K 15/045
EP     1404974 A1    4/2004
(Continued)

OTHER PUBLICATIONS

Supplementary European Search Report dated Feb. 1, 2017, in European Application No. EP 14 83 2315.
(Continued)

*Primary Examiner* — Alex W Mok
(74) *Attorney, Agent, or Firm* — Eric L. Doyle; Stephan A. Pendorf; Patent Central LLC

(57) ABSTRACT

A method for producing a coil of a compressor (1) which can be electrically driven, a coil which is produced in accordance with this method, and a stator and a compressor which can be electrically driven. The production process for the coil includes the steps of: producing (100) a first winding (101) of the coil (12), producing (200) a second winding (102) of the coil (12), and compacting (300) the first winding (101) and the second winding (102) by virtue of an external action of force. A cross-sectional area (111, 112, 111', 112') of a wire of the first winding (101) and of the second winding (102) is deformed.

18 Claims, 5 Drawing Sheets

(51) Int. Cl.
| | |
|---|---|
| H02K 3/38 | (2006.01) |
| F02B 33/40 | (2006.01) |
| F02B 39/10 | (2006.01) |
| F04B 35/04 | (2006.01) |
| H01F 41/06 | (2016.01) |
| F04D 25/06 | (2006.01) |
| F04B 39/14 | (2006.01) |
| F04D 29/58 | (2006.01) |

(52) U.S. Cl.
  CPC .......... *F04B 39/14* (2013.01); *F04D 25/0606* (2013.01); *F04D 25/0693* (2013.01); *F04D 29/5806* (2013.01); *F04D 29/5813* (2013.01); *H01F 41/06* (2013.01); *H02K 3/38* (2013.01); *H02K 15/04* (2013.01); *H02K 15/0485* (2013.01); *F05D 2220/40* (2013.01)

(58) Field of Classification Search
  CPC ............. F04D 25/0693; F04D 29/5806; F04D 29/5813; F05D 2220/40; H01F 41/06; H02K 15/04; H02K 15/0485; H02K 3/28; H02K 3/38
  USPC .......................................................... 310/208
  See application file for complete search history.

(56)  References Cited

U.S. PATENT DOCUMENTS

| | | | |
|---|---|---|---|
| 4,769,993 | A | 9/1988 | Kawamura |
| 6,676,891 | B1 | 1/2004 | Jack |
| 6,891,600 | B2 * | 5/2005 | Frissen ............... G03F 7/70758 355/72 |
| 2003/0127933 | A1 | 7/2003 | Enomoto et al. |
| 2004/0036848 | A1 * | 2/2004 | Frissen ............... G03F 7/70758 355/53 |
| 2004/0207501 | A1 | 10/2004 | Souki et al. |
| 2007/0182498 | A1 * | 8/2007 | Zumoto .................. H05G 2/00 331/83 |
| 2009/0049678 | A1 | 2/2009 | Pflueger et al. |
| 2009/0191074 | A1 | 7/2009 | Suzuki |
| 2009/0249613 | A1 * | 10/2009 | Takada ............... H02K 15/0478 29/605 |
| 2011/0076166 | A1 | 3/2011 | Godeke et al. |
| 2011/0193408 | A1 * | 8/2011 | Fuma .................. H02M 3/1584 307/9.1 |
| 2011/0198944 | A1 * | 8/2011 | Kassen .................... H02K 3/26 310/12.22 |
| 2012/0139383 | A1 | 6/2012 | Wolf |
| 2012/0146434 | A1 | 6/2012 | Nonaka |
| 2012/0274167 | A1 * | 11/2012 | Kim ........................ H02K 3/47 310/156.08 |
| 2013/0127286 | A1 | 5/2013 | Stephenson |
| 2013/0127289 | A1 | 5/2013 | Koga |
| 2014/0144412 | A1 | 5/2014 | An et al. |
| 2015/0123509 | A1 | 5/2015 | Nonaka et al. |

FOREIGN PATENT DOCUMENTS

| | | |
|---|---|---|
| EP | 1230053 B1 | 6/2004 |
| JP | 2002093654 A | 3/2002 |
| JP | 2009510988 A | 3/2009 |
| JP | 2009183012 A | 8/2009 |
| JP | 2011103733 A | 5/2011 |
| JP | 2012125080 A | 6/2012 |
| JP | 2013024041 A | 2/2013 |
| JP | 2013110861 A | 6/2013 |
| WO | 03004878 A1 | 1/2003 |
| WO | 2014030214 A1 | 2/2014 |

OTHER PUBLICATIONS

Japanese Office Action (with English language translation) dated Jun. 18, 2018, in Japanese Application No. 2016-531802.
Written Opinion and International Search Report in International Application No. PCT/US2014/048532, dated Nov. 24, 2014.

* cited by examiner

COIL FOR A COMPRESSOR WHICH CAN BE ELECTRICALLY DRIVEN, AND CORRESPONDING PRODUCTION METHOD

The invention relates to a method for producing a coil of a compressor which can be electrically driven. The present invention particularly relates to a method by means of which the power density/the degree of efficiency of a compressor for an internal combustion engine can be increased.

In conventional coil stacks of a compressor of this kind, a plurality of lines through which an electric current flows during operation are distributed over the circumference of the coil stack.

The coil can be used, in particular, in a stator of an electrical machine for driving the compressor. Electric motors of this kind usually have three or more coils, wherein the coils are of identical configuration and are arranged in a circle along the air gap. In this case, the coil connections can be laid such that the electrical connections of adjacent coils are next to one another, as a result of which said coils can be interconnected in a simple manner. In this case, the individual coils can be wound from twisted or partially twisted (also including completely non-twisted) wires. In the prior art, the current-carrying conductors of the coil are wound as closely as possible to one another in order to generate a high power density/a high degree of efficiency. However, potential for further increasing the power density/degree of efficiency of the electrical machine is not utilized in this case One object of the present invention is therefore to provide a method for producing a coil of a compressor which can be electrically driven, with which method coils with an increased power density/increased degree of efficiency can be produced.

This object is achieved by the features of claim 1.

Accordingly, a method for producing a coil of a compressor which can be electrically driven is proposed, said method comprising the following steps:

A first winding of the coil is initially produced. Within the scope of the present invention, a "winding" is to be understood to mean a loop in a conductor, wherein the conductor can be arranged in a composite line which is designed as a wire. In this way, a simply wound wire includes a number of windings which corresponds to the number of conductors contained. In this case, a "winding" corresponds to a conductor loop, which is also called a "turn". A second winding of the coil is then produced. The two windings can be produced, for example, by inserting an electrical conductor into a suitable mold. The first winding and the second winding are then compacted by virtue of an external action of force, wherein a cross-sectional area of a wire of the first winding and of the second winding is deformed. In other words, pressure is applied to the first winding and to the second winding, with the result that the outer dimensions of the coil (element) are reduced. The power density, that is to say the electrical power which can be achieved per unit volume, is increased in this way. The use of a coil of this kind in a transportation means is therefore space-saving in comparison to known coils. During the course of deformation, it is possible for, for example, a cross-sectional area of the wire which was originally in the shape of a circular disk to acquire an oval or even substantially rectangular shape.

The dependent claims contain advantageous developments of the invention.

The first winding and, respectively, the second winding can preferably be compacted together with a respective multiplicity of windings. In other words, a first multiplicity of windings, comprising the first winding, is initially jointly compacted, and then, in a second step, the second winding is compacted together with a further multiplicity of windings (which have not yet been compacted). In particular, the volume of the coil (element) can be considerably reduced in this case. By way of example, between 5% and 30%, preferably between 10% and 20%, of the volume of the coil can be reduced. It goes without saying that the material of the wires and also the insulations of the wires are compressed considerably less than pockets of air located between the wires and/or the insulations. The abovementioned percentages therefore relate to external dimensions of the coil elements.

The windings of the coil can preferably be arranged between surfaces of two tool parts, which surfaces are in the form of a segment of a circle, while the first winding and the second winding are being produced, wherein the design of the surfaces which are in the form of a segment of a circle can be adapted to match the design of an air gap in an electrical machine, in order to not have to readjust the windings later. The tool parts can have substantially linear extensions at the ends of the surfaces which are in the form of a segment of a circle. The coil can then be compacted at least in sections in the tangential direction in said extensions by one, preferably two, dies in a direction substantially parallel to the surfaces of the linear extensions. In this case, the tangential direction coincides with a direction of rotation of an electrical machine which is manufactured from the coil. In addition, the winding heads of the coil can be compacted at least in sections by one, preferably two, dies in a direction substantially parallel to the magnetically active sections of the windings, that is to say in the axial direction in relation to the electrical machine. In this way, the compaction can be performed in several dimensions since both the two tool parts and also the tangential die or dies and also the axial dies can be moved relative to one another after the windings are inserted, and a high pressure can therefore be applied to the windings.

The surfaces of the tool parts can preferably already have a curvature which is in the form of a segment of a circle and which extends, for example, over 180°, 120° or 90° and, depending on a number of coils which is to be used, serves to match the coil to an air gap between a stator and a rotor of an electrical machine for the purpose of driving the compressor. In this way, a narrow air gap with a high power density can be generated without additional geometric adjustments of the coil.

The coil can preferably be compacted in a magnetically active section (possibly a further time) after all of the windings are produced, wherein it goes without saying that the winding head of the coil can also be compacted. While compaction in the magnetically active section can be carried out in a cost-effective manner and with a relatively low level of expenditure of energy, additional compaction in the winding head can allow a further reduction in volume and increase in the power density and in the degree of efficiency.

According to a further aspect of the present invention, a coil for a compressor which can be electrically driven, which coil can be obtained by a method as described above, is proposed. In other words, the coil is equipped with at least two windings which have cross-sectional areas which are deformed by compaction during the course of manufacture of the coil. Compaction of this kind can be identified on the finished product, for example, by surfaces of the insulation or of the wires or of the conductors having surface sections which fit snugly to one another. In this case, a conductor which deviates, for example, from a cross-sectional area which is in the form of a circular disk has surface curvatures which are reduced in the direction of the closest neighbor of said conductor. The same applies to adjacent wires which comprise individual conductors. The features and combinations of features result, like the advantages, in accordance with the above-described production method according to the invention.

According to a further aspect of the present invention, a stator for an electrical drive of a compressor of an internal combustion engine is presented, said stator having a coil according to the invention as described above. The stator can also be designed such that its volume can be reduced by the compaction according to the invention, without power losses having to be accepted in the process.

The stator can preferably contain three coils which are associated with different electrical phases. In this case, the coils can be arranged in a delta circuit by adjacent electrical connections of two coils being combined in each case for the purpose of allowing an external electrical connection to make contact with said electrical connections. This moreover provides manufacturing advantages and the option of a further reduction in volume.

The coils of said stator can preferably be fixed relative to one another by means of a cured fluid, in particular stove enamel or adhesive. In this case, the fluid can be introduced into the coil by using stove enamel wire and liquefied by the action of heat. The coil is impregnated with fluid in the compacted position (within the compaction tool). In this case, an electrical voltage can be applied to the connections of the coils in order to begin to melt the stove enamel wire by imparting heat. The stove enamel solidifies before the compaction tool is opened, with the result that the coil is fixed in compacted configuration.

According to a fourth aspect of the present invention, a compressor for an internal combustion engine, which compressor can be electrically driven, is provided, said compressor having an electrical drive with a stator, as has been described in detail above. The internal combustion engine can be, for example, a petrol or diesel machine which is used for passenger cars.

All of the above-described aspects according to the invention can use the coil as a coil without an iron core. This allows a further reduction in the mass of the compressor and also advantages in respect of the degree of efficiency since there is no need for remagnetization processes within the iron core, which is not present. However, a metal jacket (for example a laminated core) can be fitted around the stator winding, in order to promote magnetic flux guidance.

Furthermore, the coil according to the invention can be dimensioned as part of an electrical 12 volt machine or a 48 V machine in order to be able to operate in conventional on-board vehicle electrical systems.

In particular, the electric motor has a low number of pole pairs since it requires a high nominal rotation speed for driving the compressor. Low numbers of polar pairs are, for example, 1, 2, 3 or 4.

According to a further aspect of the present invention, a transportation means comprising an internal combustion engine and a compressor is proposed, as has been discussed in detail above. In this case, the compressor can be designed to compress fresh air before it is supplied to a combustion chamber of the internal combustion engine.

Further details, advantages and features of the present invention emerge from the following description of exemplary embodiments with reference to the drawing, in which.

Figure 1:
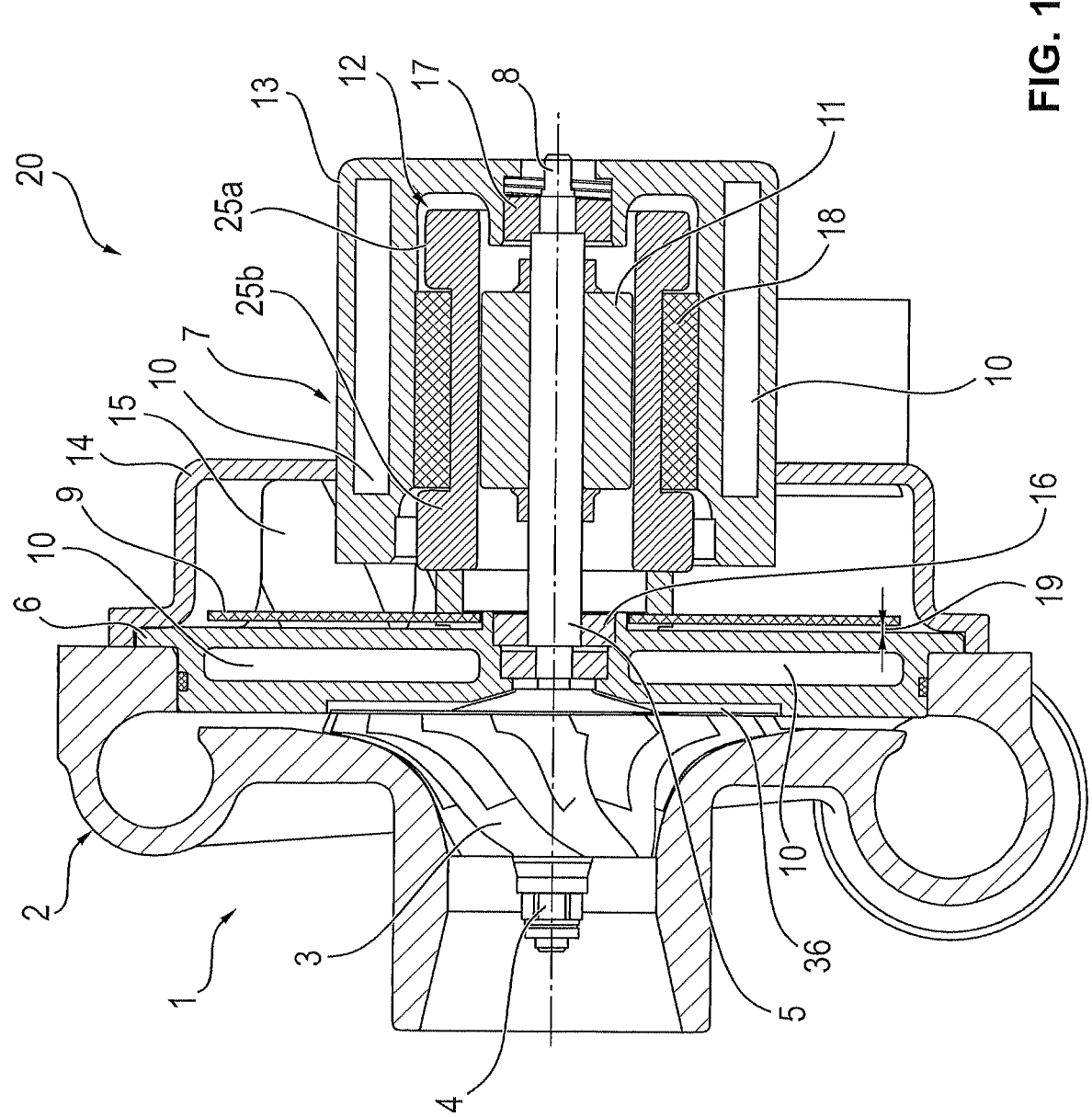
FIG. 1 is a schematically slightly simplified sectional illustration through a first embodiment of a charging apparatus according to the invention.

FIG. 1 shows an embodiment of a charging apparatus comprising an electrically driven compressor 1. The compressor 1 has a compressor housing 2 in which a compressor wheel 3 is arranged. The compressor wheel 3 is mounted on one end 4 of a rotor shaft 5.

As is also illustrated in FIG. 1, the compressor housing 2 has a compressor housing rear wall 6 which is in the form of a compressor housing cover in the illustrated embodiment. The compressor housing rear wall 6 is arranged behind the compressor wheel 3 and fixed to the compressor housing 2 and closes said compressor housing in this way.

In this case, the compressor housing rear wall 6 is provided with a cooling jacket 10, preferably for cooling water.

The compressor 1 also has an electric motor 7. The electric motor 7 comprises a shaft 8 which is connected to a rotor shaft 5. In the illustrated embodiment, the shaft 8 and the rotor shaft 5 are designed as an integral component, as is shown in detail in FIG. 1. In this case, the shaft 8 is in the form of a shaft stub which has a smaller outside diameter than the rotor shaft 5 and on which a bearing 16 is arranged. The end 4 of the rotor shaft 5 is likewise of reduced diameter in relation to the rotor shaft 5 and is fitted with a second bearing 17. As shown in FIG. 1, the bearing 17 is supported against a bearing section of a stator housing 13, whereas the bearing 16 is supported, by way of its outer ring, in a recess of the compressor housing rear wall 6.

A magnet 11 is also provided on the rotor shaft 5, said magnet interacting with a stator winding 12 which surrounds said magnet on the outside. The structure of the stator winding 12 according to the invention is discussed in greater detail in connection with FIGS. 3, 4, 8 and 9. The stator winding 12 is surrounded by an iron ring 18 in order to improve the magnetic flux guidance. A cooling jacket 10 which carries liquid is also provided in order to draw heat from the stator winding 12.

The embodiment of the compressor 1 according to FIG. 1 also has a dirt-protection cover 14 which is mounted on the stator housing 13 or on the compressor housing rear wall 6 and in which electronics components 15 of a power electronics circuit 9 or electronics printed circuit board 9 are arranged. The power electronics circuit 9 can comprise all of the required components for fulfilling the function of an electronic commutator. Said power electronics circuit is, in particular, a control circuit comprising transistors or so-called MOSFETs. The power electronics circuit 9 can also comprise sensors, in particular Hall sensors. The electronics components 15 comprise, in particular, a capacitor, amongst others.

As illustrated in FIG. 1, the power electronics circuit 9 is arranged between the compressor housing rear wall 6 and the electric motor 7 or the dirt-protection cover 14. To this end, the power electronics circuit 9 can be firmly clamped, for example, between the dirt-protection cover 14 and the compressor housing rear wall 6, or else mounted, for example fixedly adhesively bonded, on one of the two parts.

This arrangement results in the advantage that the power electronics circuit 9 is arranged adjacent to the cooling jacket 10, this considerably improving the cooling effect of said cooling jacket with respect to the power electronics circuit 9.

A thermally conductive paste can be provided between the power electronics circuit 9 and the cooling jacket 10 or the compressor housing rear wall 6 in which the cooling jacket 10 is arranged.

The compressor housing rear wall 6 could also be formed by an end wall of the stator housing 13, in which end wall the bearing 17 would then be arranged. In this embodiment, the stator housing 13 likewise has an inner cooling arrangement and therefore a cooling jacket 10, wherein, in this embodiment too, the power electronics circuit 9 is arranged between the compressor housing rear wall 6 and the electric motor 7 or its stator housing 13, and therefore enjoys the same advantages of a compact construction and improved cooling of the components.

Figure 2:
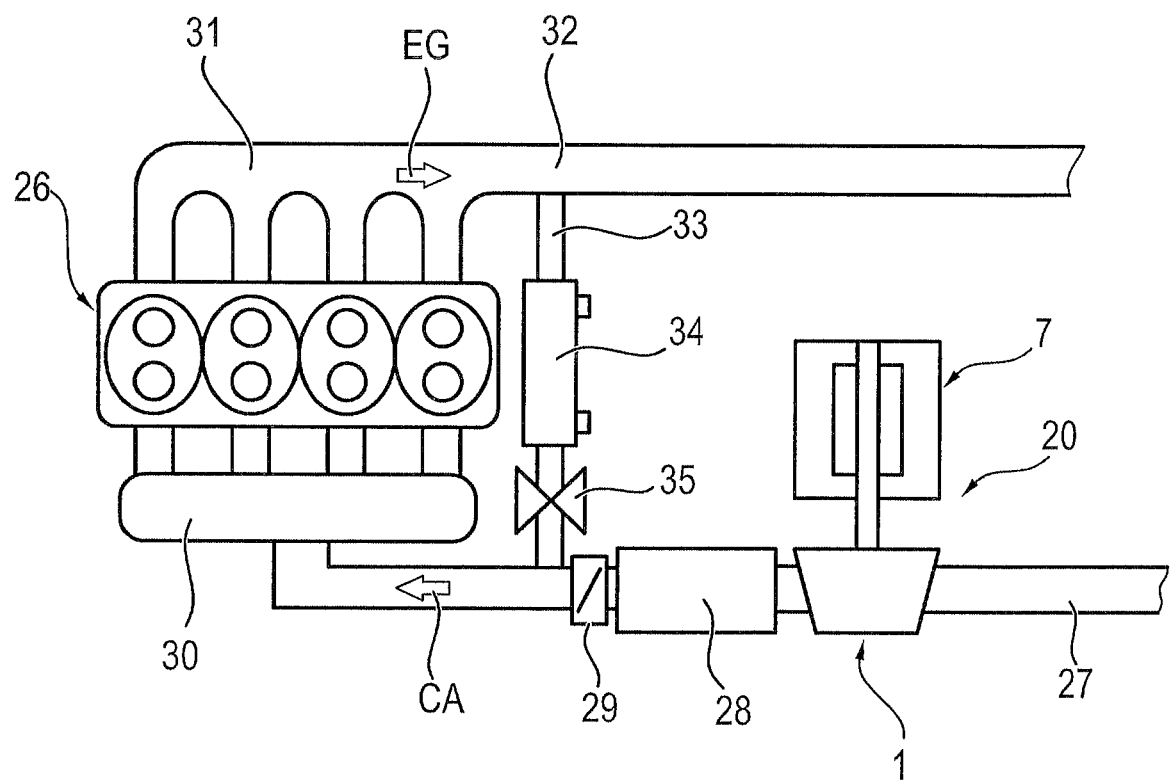
FIG. 2 is a schematically highly simplified illustration of an internal combustion engine which can be provided with a charging apparatus according to the invention.

FIG. 2 is a schematically highly simplified illustration of a combustion engine 26, for example in the form of a (diesel or petrol) internal combustion engine. The internal combustion engine 26 has an intake line 27 in which the compressor 1 of the charging apparatus 20 is arranged, said compressor being driven by the electric motor 7. A charge air cooler 28, followed by a throttle 29, can be arranged downstream of the compressor 1 in the intake line 27. The compressed air, which is symbolized by the arrow CA, from the compressor 1 is supplied to an intake manifold 30, and the cylinders of the combustion engine 26 are supplied with the compressed air from said intake manifold.

The exhaust gas EG is supplied to an exhaust gas line 32 via an exhaust gas manifold 31.

In the particularly preferred embodiment which is illustrated in FIG. 2, the internal combustion engine 26 is also provided with an exhaust gas return line 33 in which an exhaust gas cooler 34 and a valve 35 are arranged. However, said exhaust gas return line 33, together with its components 34 and 35, is not mandatory, but rather constitutes merely a particularly preferred embodiment. A variant, which is not illustrated, of the arrangement which is illustrated in FIG. 2 differs by virtue of the arrangement of the components compressor 1, electric motor 7 and charging apparatus 20 further downstream. By way of example, the assembly comprising the abovementioned components can be shifted in such a way that the compressor 1 is connected behind the throttle 29 and the valve 35 in front of the intake manifold 30.

Figure 3:
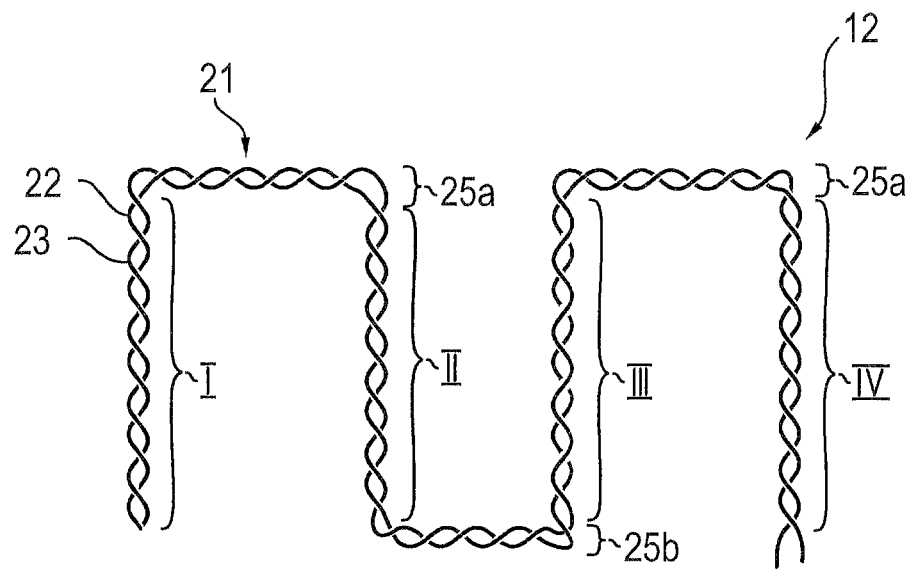
FIG. 3 is a schematic illustration of fully twisted wires of a stator winding according to the prior art.

FIG. 3 shows a first conductor 22 and a second conductor 23 of a line 21 for a coil of a stator. The conductors 22, 23 of a wire can be electrically insulated from one another in order to avoid circulating currents. The first conductor 22 and the second conductor 23 are twisted in relation to one another both in successive magnetically active sections I, II, III and IV and also in winding head regions 25a, 25b which are situated between said sections. In other words, the conductors 22, 23 have a first degree of twisting in the respective magnetically active section I, II, III and IV which is identical to the second degree of twisting in the winding head region 25a, 25b. Although the illustrated twisting can prevent compensation currents ("circulating currents") between the conductors 22, 23, firstly, additional volume is taken up in the magnetically active sections I, II, III and IV and, secondly, a mechanical strength of the line 21, which may be obstructive during shaping of the stator winding 12 and can prevent a compact design of the coil, is already produced before the stator winding 12 is shaped.

Figure 4:
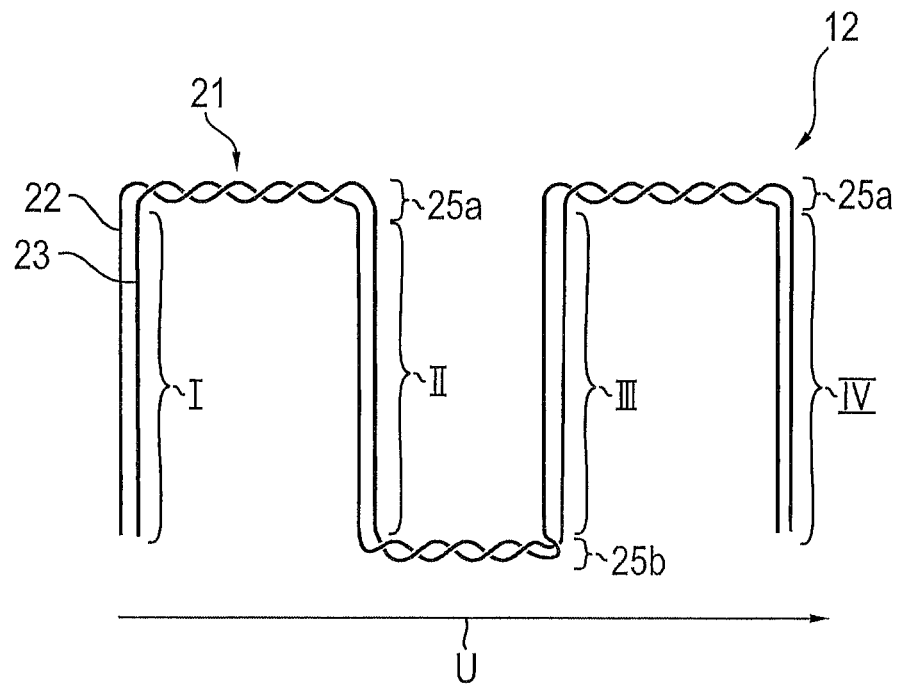
FIG. 4 is a schematic illustration of wires of a stator winding, which wires are twisted only in the winding head, according to one exemplary embodiment of the present invention.

FIG. 4 shows a stator winding 12 of alternative configuration. It can be seen in said figure that that the conductors 22, 23 of the line 21 are twisted in relation to one another in the winding head region 25a, 25b, as illustrated in FIG. 2, while they run parallel next to another in a non-twisted manner in the magnetically active sections I, II, III and IV. In the process, said conductors change the relative order in relation to one another in each case in successive magnetically active sections I, II, III and IV. While the first conductor 22 is arranged to the left (in the figure) and at the front in the circumferential direction U in the first magnetically active section I, said first conductor is arranged behind the second conductor 23 with respect to the circumferential direction U in the second magnetically active section II. The change in the order between the conductors 22, 23 changes continuously in the circumferential direction U. Owing to the non-twisted design of the conductors 22, 23 in the magnetically active sections I, II, III, IV, a compact design of the stator is possible and application of the method according to the invention is accompanied with a reduced risk of damage to electrical insulations of the conductors 22, 23.

Figure 5:
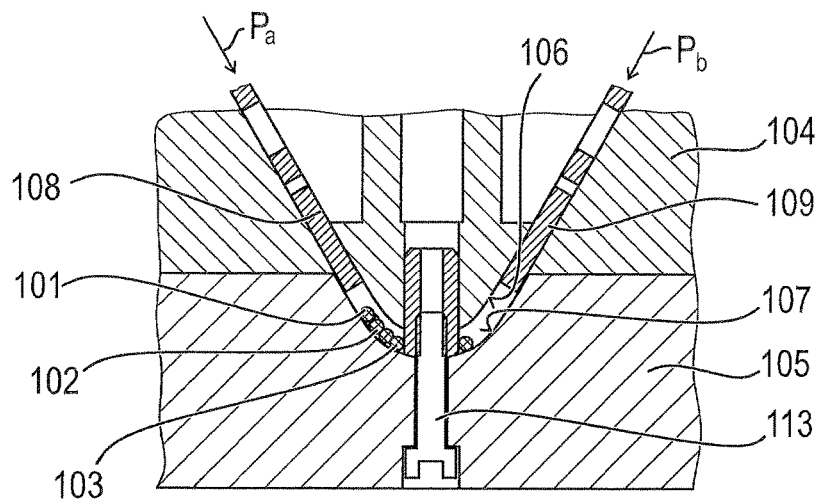
FIG. 5 is a sectional illustration of an exemplary embodiment of a tool which can be used for compaction purposes.

FIG. 5 shows a sectioned side view through a tool of an exemplary embodiment of a production method according to the invention. Wires 101, 102, 103 of a coil 12 are inserted into a lower tool part 105 as stator winding. The wires 101, 102, 103 are compacted in the vertical direction by means of an upper tool part 104 which is guided relative to the lower tool part 105 by means of a guide 113. In other words, the wires 101, 102, 103 are clamped between substantially parallel surfaces 106, 107. A first die 108 and a second die 109 can be pushed between the tool parts 104, 105 in the direction of two arrows $P_a$, $P_b$ and compact the wires 101, 102, 103, wherein the cross-sectional areas of said wires are deformed, as is illustrated in FIG. 8.

Figure 6:
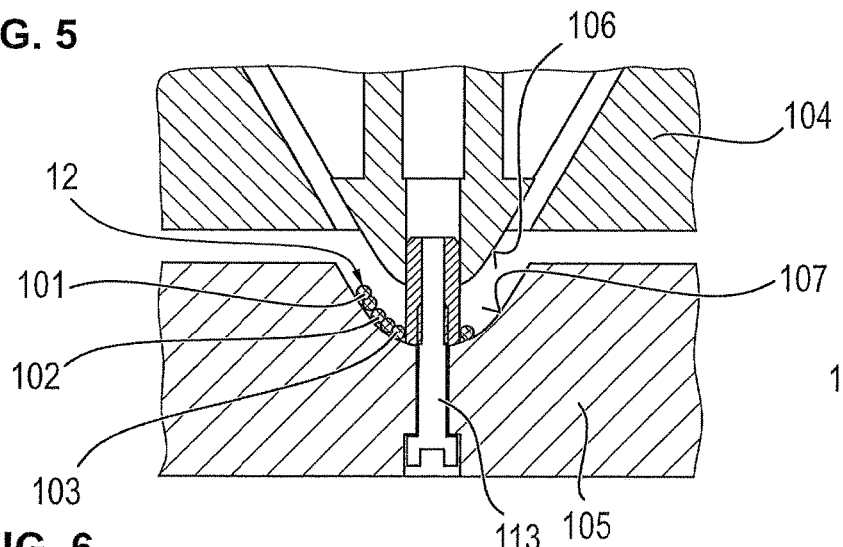
FIG. 6 shows the tool which is illustrated in FIG. 5 after it is opened.

In FIG. 6, the upper tool part 104 has been raised along the guide 113 in order to be able to remove the coil 12 after compaction is complete.

Figure 7:
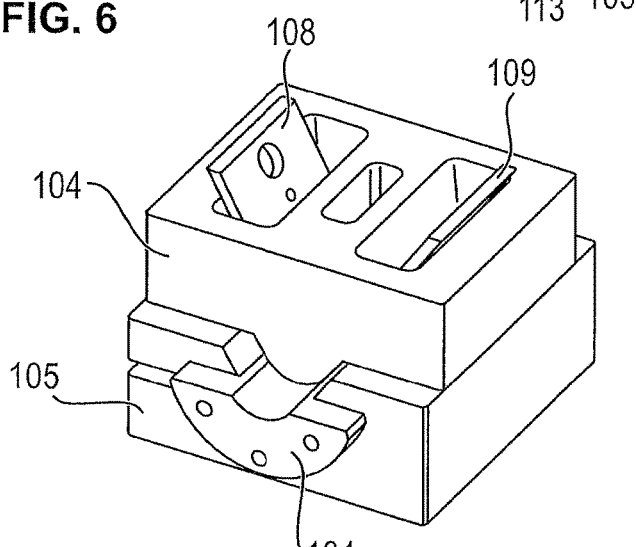
FIG. 7 shows a perspective view of the tool which is illustrated in FIGS. 5 and 6.

FIG. 7 shows a perspective view of the production apparatus which is illustrated in FIGS. 5 and 6. It can be seen in said figure that the upper tool part 104 is provided with openings through which the first die 108 and the second die 109 can penetrate as far as into the gap, which is shown in FIG. 5, between the surfaces 106 and 107. A third die 134, which is pushed between the upper tool part 104 and the lower tool part 105 in the axial direction, for compaction of the winding heads is additionally illustrated.

Figure 8A:
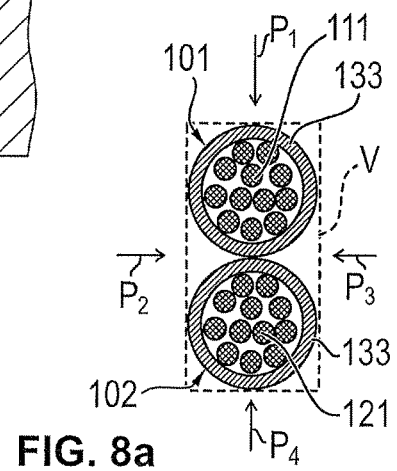
FIG. 8 shows basic sketches for illustrating a change in cross section which takes place due to the compaction according to the invention.

FIG. 8a shows two wires 101, 102, the copper cores 111, 121 of which have cross-sectional areas which are substantially in the form of a circular disk. The wires 101, 102 are surrounded by an insulation 133 which accordingly has cross-sectional areas which are substantially in the form of a ring. The arrows $P_1$, $P_2$, $P_3$, $P_4$ illustrate an action of force during the course of a compaction process according to the invention of the wires 101, 102.

Figure 8B:
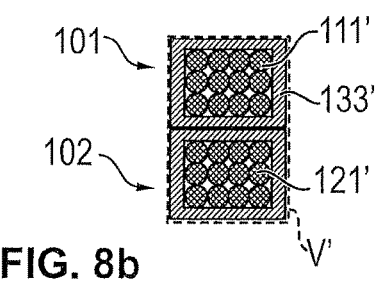

FIG. 8*b* shows the result of the compaction process indicated in FIG. 8*a*. The copper cores 111', 121' have acquired a substantially rectangular cross-sectional shape. The insulation 133' of the wires 101, 102 has also adapted to the rectangular shape. It can be seen that the volume V, which is indicated in FIG. 8*a*, of the outside dimensions of the wires 101, 102 has reduced to the volume V' which is illustrated in FIG. 8*b*. There are substantially no longer pockets of air, as a result of which the power density is increased.

Figure 9:
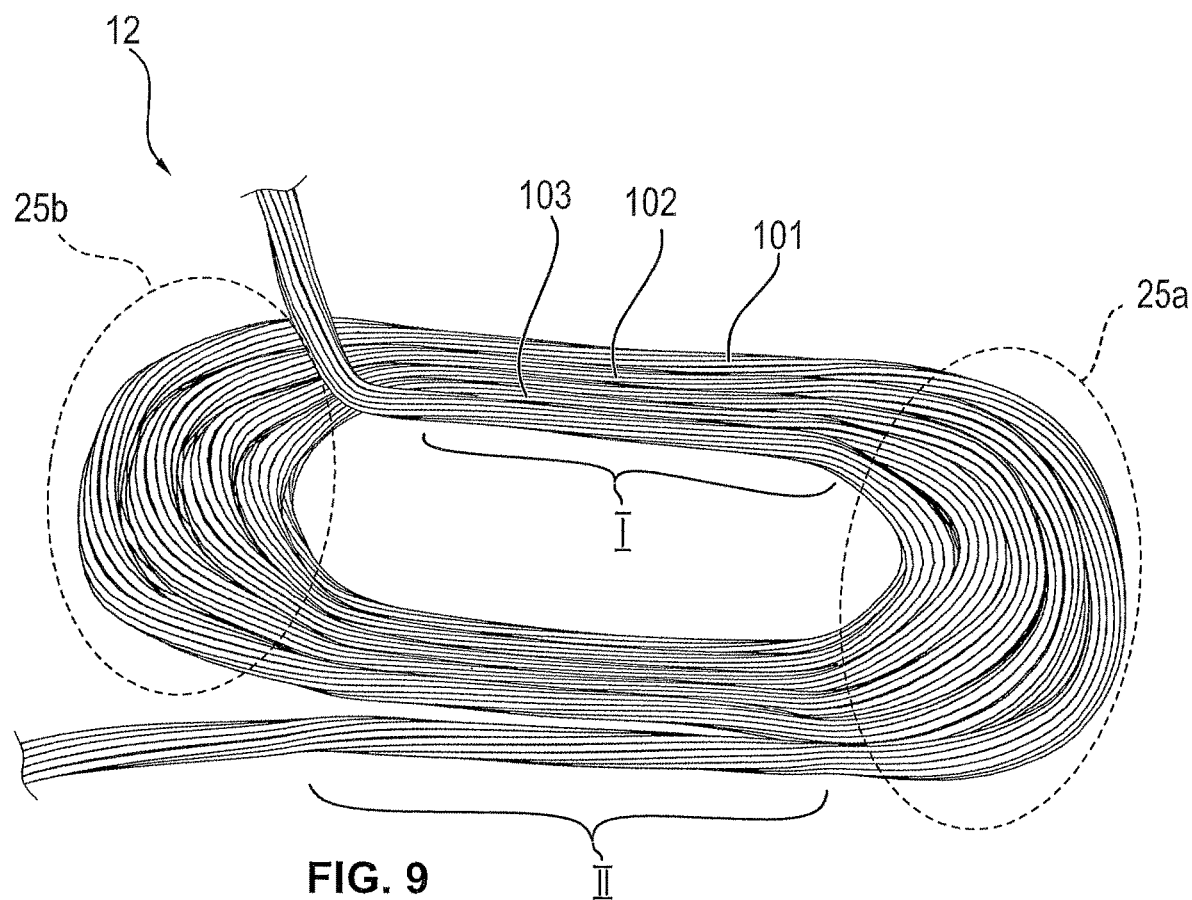
FIG. 9 is a perspective illustration of a coil which is compacted in the magnetically active region.

FIG. 9 shows a perspective view of an alternative exemplary embodiment of a coil 12 which is manufactured according to the invention. The coil 12 has compacted wires 101, 102, 103 in its magnetically active sections I, II, while the winding heads 25*a*, 25*b* substantially have their (uncompacted) original configuration. Said illustration also shows the potential for a reduction in volume by virtue of the compaction process according to the invention.

Figure 10:
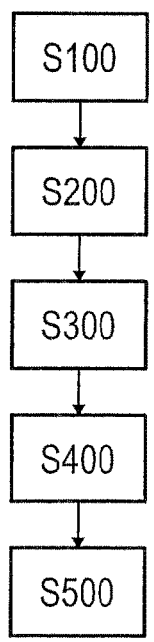
FIG. 10 shows a flowchart which illustrates method steps of an exemplary embodiment of a production method according to the invention.

FIG. 10 shows a flowchart which illustrates the steps of an exemplary embodiment of a production method according to the invention. A first winding of a coil 12 is produced in step S100. A second winding of the coil 12 is produced in step S200. Then, (for example axial and tangential and radial) compaction of the first winding and of the second winding is performed in step S300. In step S400, the compacted coil is arranged in a tool for assembling a stator according to the invention.

In other words, a tool for shaping the stator is equipped with several coils which are manufactured according to the invention. Then, in step S500, the stator is manufactured by the inserted coils 12 being compacted once again and being fixed relative to one another by means of stove enamel. The compaction of each coil (independently of the other coils) is also fixed in this way.

In addition to the above written description of the invention, reference is hereby explicitly made, for additional disclosure thereof, to the diagrammatic illustration of the invention in FIGS. 1 to 10.

LIST OF REFERENCE SIGNS

1 Compressor
2 Compressor housing
3 Compressor wheel
4 End
5 Rotor shaft
6 Compressor housing rear wall
7 Electric motor, in particular brushless DC motor
8 Shaft
9 Power electronics circuit/electronics printed circuit board
10 Cooling jacket
11 Magnet
12 Stator winding, coil
13 Stator housing
14 Dirt-protection cover
15 Electronics components
16, 17 Bearings
18 Iron ring
19 Gap
20 Charging apparatus
21 Line
22 to 24 Conductor
25*a*, 25*b* Winding head region
26 Internal combustion engine
27 Intake line
28 Charge air cooler
29 Throttle
30 Intake manifold
31 Exhaust gas manifold
32 Exhaust gas line
33 Exhaust gas return line
34 Exhaust gas cooler
35 Valve
36 Compressor wheel rear side
101, 102, 103 Wires
104, 105 Tool parts
106, 107 Surfaces of the tool parts
108, 109 Dies
111 Copper core
113 Guide
121 Copper core
133 Insulation
134 Die
S100 to S500 Method steps
V Volume
I to IV Magnetically active section

The invention claimed is:

1. A method for producing a compressor (1) including an electric drive motor (7) having a stator with a coil (12) and having a rotor, said electric drive motor (7) having a predefined air gap between the stator and the rotor, the method comprising the steps of:
   producing (S100) a first winding (101) of the coil (12) from multiple loops of wire (111, 111'),
   producing (S200) a second winding (102) of the coil (12) from multiple loops of wire (121, 121'),
   compacting (S300) the first winding (101) and the second winding (102) by virtue of an external action of force, wherein a cross-sectional area of a wire (111, 111') of the first winding (101) and a cross-sectional area of a wire (121, 121') of the second winding (102) is deformed;
   wherein, for said compacting (S300) in a first direction, the windings (101, 102) of the coil (12) are arranged between substantially parallel surfaces (106, 107) of first and second tool parts (104, 105), wherein the surfaces (106, 107) of the tool parts (104, 105) have a curvature which serves to match the coil (12) to the predefined air gap between the stator and the rotor of the electric drive motor (7), and wherein compacting in the first direction occurs when the first tool part (104) is moved towards the second tool part (105),
   wherein the tool parts have first and second linear extension surfaces at the ends of the surfaces which have a curvature,
   wherein the windings (101, 102) of the coil (12) are compacted by a first die (108) moving in a second direction ($P_a$) parallel to the first linear extension surfaces of the two tool parts (104, 105),
   wherein the windings (101, 102) of the coil (12) are compacted by a second die (109) in a third direction ($P_b$) parallel to the second linear extension surfaces of the two tool parts (104, 105),
   whereby the compacted windings (101, 102) have a surface corresponding to the air gap between stator and rotor.

2. The method as claimed in claim 1, wherein, in a first step, the first winding (101) is compacted together with a first multiplicity of windings, and, in a second step, the second winding (102) is compacted together with a second multiplicity of windings to form a coil (12).

3. The method as claimed in claim 2, wherein volume of the coil (12) is reduced by 5% to 30%.

4. The method as claimed in claim 2, wherein volume of the coil (12) is reduced by 10% to 20%.

5. The method as claimed in claim 1, wherein the coil is compacted in a magnetically active section (I, II, III, IV), and wherein a winding head (25a, 25b) of the coil is also compacted, after all of the windings (101, 102) of the coil are produced.

6. A coil for an electrically driven compressor (1) obtained by the method as claimed in claim 1.

7. A stator for an electrical drive of a compressor (1), comprising a coil as claimed in claim 6.

8. The stator as claimed in claim 7, comprising three coils which are arranged in a delta circuit by adjacent electrical connections of two coils being combined in each case for the purpose of allowing an external electrical connection to make contact with said electrical connections.

9. The stator as claimed in claim 7, the coils of said stator being fixed relative to one another by means of a cured fluid.

10. A compressor (1) for an internal combustion engine, which compressor can be electrically driven and comprises an electrical drive having a stator as claimed in claim 7.

11. The stator as claimed in claim 7, the coils of said stator being fixed relative to one another by means of a cured insulating enamel or adhesive.

12. The method as claimed in claim 1, wherein each wire comprises a plurality of copper strands encased in insulation.

13. The method as claimed in claim 1, wherein the second winding is compacted subsequent to the first winding.

14. The method as claimed in claim 1, wherein the first and second windings are compacted together.

15. The method as claimed in claim 1, wherein, in a first step, a first multiplicity of windings is compacted together, and, in a second step, a second multiplicity of windings is compacted together to form a coil.

16. The method as claimed in claim 1, wherein the curvature of the surfaces (106, 107) of the tool parts (104, 105) extends over 90°.

17. The method as claimed in claim 1, wherein the curvature of the surfaces (106, 107) of the tool parts (104, 105) extends over 120°.

18. The method as claimed in claim 1, wherein the curvature of the surfaces (106, 107) of the tool parts (104, 105) extends over 180°.

* * * * *